Dec. 21, 1965 R. A. BUSETH ETAL 3,224,728
SELF-SEALING COUPLING
Filed April 18, 1960 2 Sheets-Sheet 1
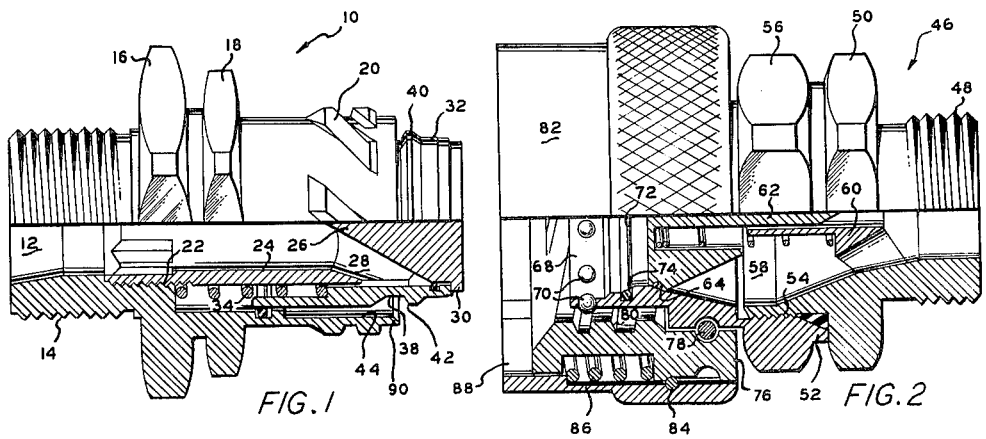
FIG. 1
FIG. 2
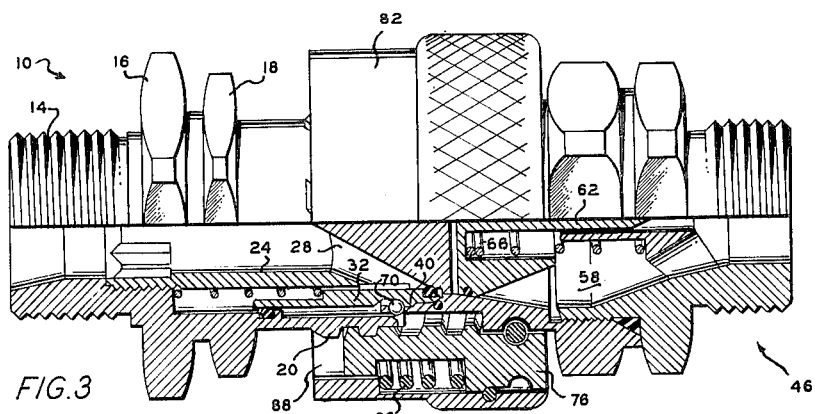
FIG. 3
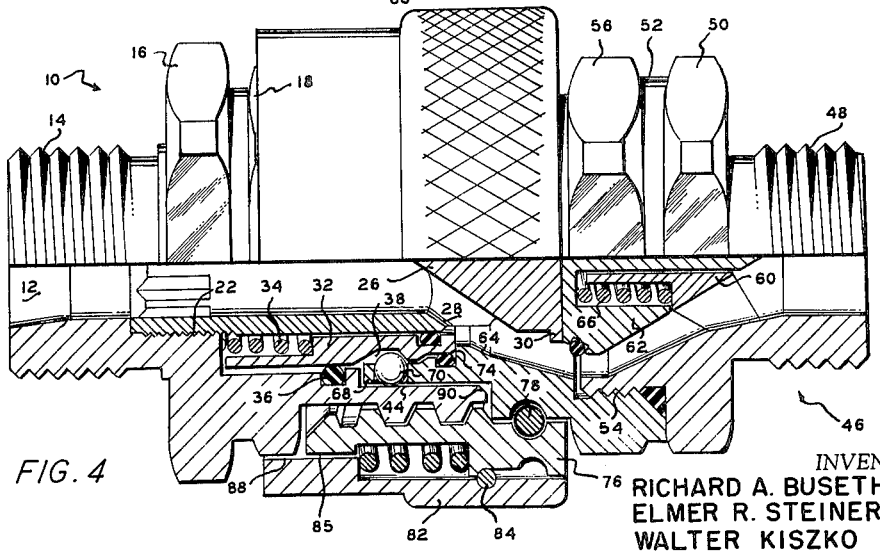
FIG. 4
INVENTOR
RICHARD A. BUSETH
ELMER R. STEINERT
WALTER KISZKO
BY *Beaman & Beaman*
ATTORNEY

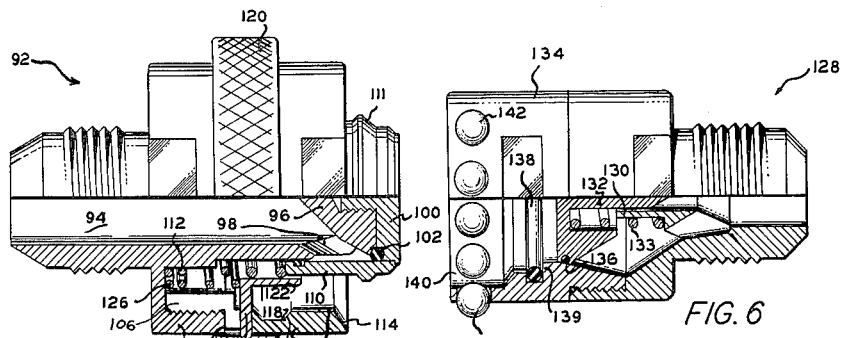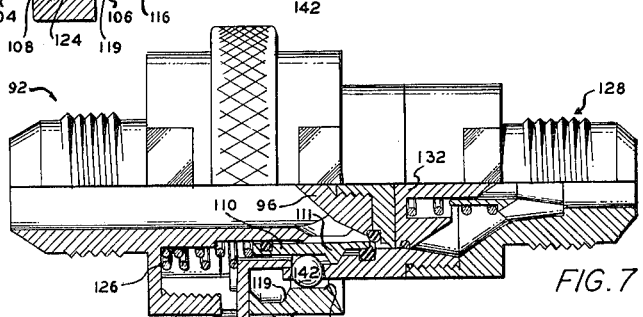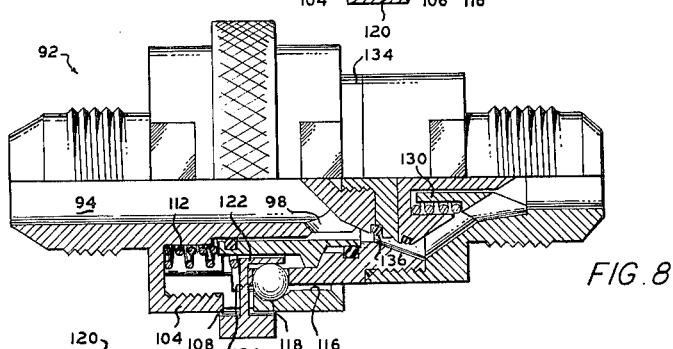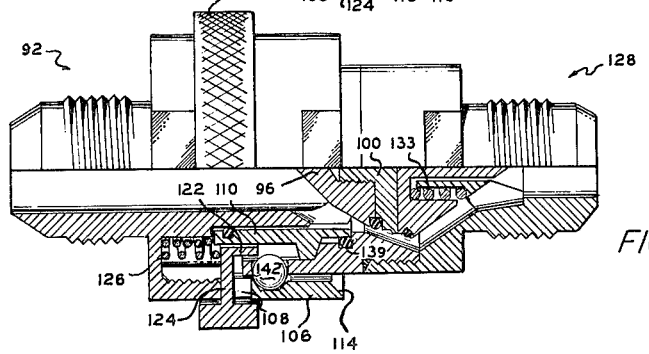

United States Patent Office 3,224,728
Patented Dec. 21, 1965

3,224,728
SELF-SEALING COUPLING
Richard A. Buseth and Elmer R. Steinert, Jackson, Mich., and Walter Kiszko, Van Nuys, Calif., assignors to Aeroquip Corporation, Jackson, Mich., a corporation of Michigan
Filed Apr. 18, 1960, Ser. No. 22,949
13 Claims. (Cl. 251—149.6)

The invention relates to a fluid coupling of the self-sealing type and is particularly directed to a fluid coupling which produces a positive closing motion of the valve components of at least one of the coupling halves during uncoupling.

The most common types of self sealing fluid couplings employ a poppet or check valve in each coupling half to prevent the flow of fluid from the associated conduit upon disconnection of the coupling halves. While it is conventional to employ complementary mating surfaces on the mutually abutting portions of the valves of the halves to reduce the loss of fluid during connections and disconnections, it is virtually impossible to totally eliminate loss of fluid during the connection or disconnection of the coupling halves with this type of structure. The poppet or check valve type of coupling suffices in most applications wherein the fluid passing through the coupling is relatively noncorrosive, such as conventional hydraulic fluids, wherein a slight loss of fluid is not serious. However, when piping highly corrosive fluids, such as nitric acid or any of the many active chemical fuels or compositions employed in the missile field, even a small loss of the fluid can be dangerous to both the nearby personnel and equipment.

A self-sealing coupling employing a sliding sleeve encompassing an internally supported seat has proven satisfactory in overcoming fluid loss during connection and disconnection and is widely used in couplings handling highly corrosive fluids. However, under particular circumstances the operation of this type of valved coupling becomes inconsistent. One of the characteristics of this type of valve is that considerable friction takes place between the sleeve and coupling body during movement of the sleeve. As a spring usually biases the sleeve toward the closed position, the closing of the sleeve is dependent solely upon the force exerted by this spring and should the coefficient of friction between the sleeve and associated coupling half increase to the point where the spring force is insufficient to overcome this friction, the sleeve will not completely close and the coupling will lose fluid. Such malfunctioning has been usually experienced at low temperatures and when fluids having little or no lubricity are employed. While such occurrences could be reduced by employing a stronger sleeve biasing spring, this is not a practical solution to the problem as it increases the force necessary to connect the couplings and is still not completely reliable as the resistance to closing the sleeve becomes very high under certain conditions.

To completely eliminate the possibility of the sleeve not closing or fully closing upon disconnection of the coupling halves, it is the purpose of the invention to provide positive means for closing the valve during separation of the halves. To this end means are provided on the coupling half not incorporating the sleeve which actuates the sleeve during separation of the halves to shift the sleeve to the closed position. Upon the sleeve reaching the fully closed position the sleeve actuating means releases its hold on the sleeve and the coupling halves become completely disconnected. In the practice of the invention, the engagement and releasing of the sleeve by the sleeve actuating means is automatic and requires no attention by the operator and connection and disconnection of a coupling in accord with the invention is achieved by the coventional relative axial movement of the coupling halves.

It is thus an object of the invention to provide a self-sealing fluid coupling having valve components within at least one of the coupling halves and means mounted on the other coupling half positively actuating the valve components to the closed position during separation of the coupling halves.

Another object of the invention is to provide a self-sealing fluid coupling wherein means mounted on one of the coupling halves automatically engages and positively shifts valve components within the other coupling half to the open and closed positions during connection and disconnection of the coupling halves, respectively.

Yet another object of the invention is to provide a self-sealing fluid coupling having valve components in at least one of the coupling halves and means within the other coupling half to shift said valve components to the closed positions during disconnection of the coupling halves, said means also serving to maintain the coupling halves in the fully connected relation.

These and other objects of the invention arising from the structural configuration and relationships of components of embodiments thereof will be apparent from the following description and accompanying drawings wherein:

FIG. 1 is an elevational view, partly in section of the male half member of one embodiment of the coupling of the invention, FIG. 2 is an elevational view, partly in section, of the female half member of the embodiment of the invention, shown in FIG. 1, FIG. 3 is an elevational, partially in section, view of the members of FIGS. 1 and 2 in partially connected relation, FIG. 4 is an enlarged, partially sectioned, elevational view of the members of FIGS. 1 and 2 in the fully connected relation, FIG. 5 is an elevational view, partially in section, of the male member of another embodiment of a coupling in accord with the invention, FIG. 6 is an elevational view, partially in section, of the female member of the coupling employed with the embodiment of FIG. 5, FIG. 7 is an elevational view, partially in section, of the members of FIGS. 5 and 6 as partially connected, FIG. 8 is an elevational, partially sectioned view, of the members of FIGS. 5 and 6 in the fully connected relation, and FIG. 9 is an elevational view, partially in section, of the members of FIGS. 5 and 6 in a fully coupled relation with the ball retainer moved to the inoperative position.

Referring to the embodiment of the invention disclosed in FIGS. 1 to 4, it will be noted that the male body member half 10 is of tubular configuration having an axial bore 12 therethrough and is formed with threads 14 and hexagonal portions 16 and 18 on the exterior. A thread 20 of large pitch is also formed on the exterior of the body member for a purpose which will be later described. Internally the body member 10 is threaded as at 22 to permit the valve seat support 24 to be concentrically affixed therein. The valve seat support 24 consists of a substantially tubular member having the end closed by a head 26 and a plurality of ports 28 extend through the side of the valve seat member and communicate with the interior thereof. A lip 30 is defined on the head 26 to serve as an abutment for the valve sleeve 32 and a cylindrical sealing surface is formed adjacent thereto to provide a sealing engagement with the valve sleeve as will be later apparent.

A tubular valve sleeve 32 concentrically circumscribes the valve seat support 24 and is mounted within the body member 10 for relative axial movement thereto. An O-ring is mounted within a groove near the outer end of the valve sleeve and a spring 34 interposed between the body member and the valve sleeve 32 continuously biases the valve sleeve to the closed position as illustrated in FIG. 1. It will be appreciated that in the closed position the rightmost end of the valve sleeve engages the lip 30 of the valve seat support 24 and the O-ring produces a sealingly engagement with the support. A sealing O-ring 36 is mounted within the body member 10 and contacts the exterior surface of the valve sleeve 32 to seal the sleeve with respect to the body member. An annular recess 38 is defined in the exterior surface of the valve sleeve and an annular rib 40 is also defined thereon to provide a shoulder 42 for reasons later described. A cylindrical back surface 44 is defined on the body member, concentric therewith, and it will be noted that the surface 44 is in opposed relation to the recess 38 and extends for a considerable axial length of the body member.

The other body member half 46 of this embodiment, is illustrated in FIG. 2 and it will be noted that the body member 46 is provided with exterior threads 48 and a hexagonal wrench engaging portion 50. An adapter sleeve 52 is affixed to the body member 46 by means of threads 54 and a wrench engaging hexagonal portion 56 is provided upon the adapter sleeve for facilitating the connection. Together the body member 46 and the adapter sleeve 52 constitute a tubular female member having a bore 58 in which is located a poppet valve spider 60 supporting a poppet valve 62. The internal portion of the adapter sleeve is reduced in diameter in the region 64 so as to provide a sealing engagement with the poppet valve 62 when the valve is in the closed position as shown in FIG. 2. A spring 66, interposed between the poppet valve 62 and spider 60 maintains the valve biased toward the closed position.

The leftmost portions of the adapter sleeve constitute an annular ring-like portion 68 in which a plurality of radially movable ball elements 70 are supported. The balls 70 are located within radially extending holes defined in the ring-like portion 68 and these holes may be slightly tapered in one direction and deformed inwardly adjacent the periphery thereof on the opposite side of the ring portion whereby the ball is first inserted into the hole and then the deformation takes place to lock the ball within the hole yet permit a relative radial movement of a limited degree of the ball relative to the ring portion. The adapter sleeve 52 is also formed with a groove in which the O-ring 72 is mounted and a projection is provided adjacent the O-ring to define an annular abutment shoulder 74.

A nut 76 is rotatably mounted upon the adapter sleeve 52 by means of a key wire 78 which permits the nut to rotate relative to the adapter sleeve but prohibits relative axial movement thereto. Threads 80 are defined on the nut and these threads engage the threads 20 formed upon the body member 10 during coupling of the two body members. An actuating sleeve 82 circumscribes the nut 76 and is affixed thereto by a key 84 cooperating with an annular groove in the nut which permits the actuating sleeve to move axially with respect to the nut and a hexagonal nut surface 85 slidably engaging with a hexagonal recess 88 prevents relative rotatable motion between the sleeve and nut. The sleeve 82 is knurled on the exterior surface for gripping by the operator and a spring 86 interposed between the nut and sleeve biases the sleeve to the left as shown in FIG. 2. The inner bore of the sleeve 82 adjacent the open end thereof is formed with a hexagonal configuration 88 which is complementary in shape and of slightly greater size than the hexagonal surface 18 of the body member 10. The dimension and configuration of the hexagonal configurations 18 and 88 are such whereby the hexagonal portion 18 may be received within the hexagonal recess 88.

In operation, the body members 10 and 46 are affixed to conduit members, not shown, by means of the threads 14 and 48, respectively. In most cases the conduits will be of the flexible hose type conducting either pressurized fluids or gases and, thus, the interior bores of the body members will be subject to the pressurized medium which will not escape from the body members due to the closed relationship of the valve sleeve 32 and the poppet valve 62 with their respective seats.

To couple the body members 10 and 46 in fluid communicating relation the axes of the coupling members are aligned and the coupling members are moved toward each other in the known manner. Referring to FIG. 3, the relative position of the components of the coupling halves is illustrated upon engagement of the outer end of the valve sleeve 32 with the shoulder 74 of the female member as shown. To achieve this relation it will be noted that the threads 20 are partially engaged with the threads 80 of the nut 76 and, hence, the nut has been partially rotated to achieve this phase of the connection. In FIG. 3 it will be observed that the diameter of the ring portion 68 of the adapter sleeve 52 is slightly greater than the diameter of the annular rib 40 upon the valve sleeve 32 and therefore the ring will encompass the valve sleeve and slide over the rib. To permit this relationship, the rib 40 displaces the balls 70 radially outwardly permitting them to clear the rib and, as the body members 10 and 46 are brought closer together, the ball members 70 engage the tapered surface 90 of the body member 10 which moves the ball members radially inwardly into the recess 38. Continued movement of the coupling halves during connection engages the backing surface 44 with the ball members to maintain the ball members within the recess 38 during the remainder of the coupling action of the body members.

Continued movement of the body members 10 and 46 toward each other by rotation of the nut 76 engages the outermost surface of the valve seat head 26 with the outer abutment surface of the poppet valve 62 and, as these abutment surfaces are both planar, fluid and other foreign matter will be excluded therebetween. Continued movement of the coupling members will move the poppet valve 62 to the right with respect to the reduced seat region 64 and the valve sleeve 32 will move to the left with respect to the valve seat support 24 thereby uncovering the ports 28. Referring to FIG. 4 it will be observed that in the fully connected position the ports 28 establish communication between the bore of the body member 10 and the bore of the body member 46 to permit the flow of gas or fluid through the coupling. During the final stages of the connection of the body members the leftmost edge of actuating sleeve 82 will engage the hexagonal portion 18 and cause the actuating sleeve to be moved to the right with respect to the nut 76. This axial movement of the sleeve with respect to the nut continues until the hexagonal recess 88 aligns with the hexagonal configuration of the portion 18 permitting the spring 86 to bias the sleeve to the left which encompasses the hexagonal portion 18 and locks the sleeve and the nut and the body member 10 against relative rotation. To disconnect the coupling members it is necessary to first axially translate the nut actuating sleeve 82 away from the body member 10 to disengage the hexagonal recess 88 before the sleeve may be rotated to rotate the nut 76 and, thus, disengage the body members from each other. The nut and actuating structure form no part of the instant invention and the operation thereof is described in greater detail in the assignee's Patent No. 2,934,359 of April 26, 1960.

As stated in the objects of the invention one of the basic purposes thereof is to insure that the valve sleeve 32 positively engages the valve seat defined on support 24 upon disconnection of the body members. In conventional coupling embodiments of this type, the closing of the valve sleeve is solely actuated by the spring similar to spring 34. However, due to excessive friction caused by extreme temperature conditions between a valve sleeve and a body member or valve seat element, or the lack of lubricity by the fluid passing through the coupling, the operation of the valve sleeve when due solely to the spring becomes inconsistent. To insure that the valve sleeve 32 of the invention completely closes upon disconnection of the body members, the backing surface 44 maintains the radially movable balls 70 within the recess 38 during the complete closing movement of the valve sleeve 32. Thus, as the body member 10 and the body member 46 are being separated the ball members will axially move relative to the backing surface and pull the valve sleeve to the right, by means of the engagement of the balls with the shoulder 42. The positive connection between the balls and the valve sleeve will continue until the valve sleeve is in the fully closed position as shown in FIG. 3 whereupon the backing surface 44 is no longer in engagement with the balls and the balls are free to move radially outwardly to clear the rib 40 and permit complete separation of the coupling member halves. It will be understood that during the separation of the body members the poppet valve 62 will also be closing under the influence of spring 66.

As the connection of the body member 46 with the valve sleeve 32, by means of the balls 70 and shoulder 42, is of a positive nature there is no possibility that the coupling members may separate without fully closing the valve sleeve. Thus, the invention provides a simple, yet effective, means for positively actuating the valve sleeve in both the opening and closing directions of movement.

Another embodiment of the invention is disclosed in FIGS. 5 through 9 wherein the radially movable ball elements also function to maintain the connection between the body members as well as positively insure that the sleeve member is shifted to the closed position upon disconnection of the body members. Referring to FIG. 5 the male portion of the coupling consists of a body member half 92 of generally tubular configuration having a bore 94 defined therein. The rightmost end of the bore is closed by a valve seat portion 96 having ports 98 defined therein communicating with the bore 94. The valve seat portion includes a head abutment 100 threadedly affixed thereto wherein a resilient seal 102 may be firmly affixed to the seat portion. The body member 92 is provided with a concentric radially spaced ring-like portion 104 which is internally threaded whereby a threaded sleeve 106 may be affixed to the body member to become a permanently assembled portion thereto. The sleeve 106 is radially slotted at 108 at diametrically opposed locations to provide lateral access through the side of the male coupling half for actuation of the ball retainer ring as will be later apparent.

A valve sleeve 110, having an annular rib 111 defined thereon, is concentrically supported upon the body member 92 for axial sliding movement thereto and a seal is provided between the sleeve member and body member to establish a sealing connection therebetween. The valve sleeve 110 is illustrated in the closed position in FIG. 5 wherein the ports 98 are sealed, and a spring 112 is interposed between the body member 92 and the valve sleeve to continually bias the valve sleeve to the closed position.

The sleeve 106 is defined with a conical surface 114 on the outer end thereof which intersects the cylindrical backing surface 116. An annular recess 118 is formed in the sleeve adjacent the backing surface to define a shoulder 119 and to receive the balls as will be later described.

The ball retainer consists of an exteriorly accessible knurled ring 120 and an interior ring 122 which is in spaced and opposed relation to the recess 118 a pair of radially extending arms 124, one of which is shown, interconnect the rings 120 and 122 and extend through the slots 108. The slots 108 are of sufficient axial dimension to permit the ball retainer to be shifted axially a considerable degree and a spring 126 interposed between the body member 92 and the ring 122 normally biases the ball retainer to the right as shown in FIG. 5.

The female half of the fluid coupling of this embodiment is disclosed in FIG. 6 and is of a configuration similar to that of FIG. 2, except that a nut is not employed to facilitate the connection between the coupling halves. The body member 128 is provided with exterior threads, as is the body member 92, for facilitating connection of the body members to the associated conduits, and the interior of the body member is provided with an axial bore which communicates with the pressurized medium. A valve spider 130 is mounted within the bore and slidably supports a poppet valve 132 therein. The spring 133 imposed between the spider 130 and the poppet valve biases the poppet valve to the left to the closed position. An adapter sleeve 134 is threadedly affixed to the body member 128 and is interiorly formed with the reduced portion 136 which functions as the valve seat for engagement with the poppet valve as shown in FIG. 6. An O-ring 138 is mounted within the adapter sleeve, for sealing engagement with the valve sleeve 110, and a shoulder 139 is defined therein for an abutting relationship with the valve sleeve to shift the valve sleeve to the open position during connection of the coupling halves. The ring portion 140, formed on the adapter, is of annular configuration and is provided with a plurality of spaced holes in which the ball elements 142 are supported. As in the embodiment of FIGS. 1 through 4, the balls 142 are mounted within the holes such that they are permitted limited radial movement with respect to the ring member yet the holes are formed as to prevent the balls from completely separating from the holes.

To connect the body member 92 with the body member 128 the axes thereof are aligned and the body members are moved toward each other without rotation. As the body members come together the ring portion 140 will receive the valve sleeve 110 and the annular rib 111 thereof will engage the balls 142 and move them radially outwardly to permit the ring portion to slip over the valve sleeve. Shortly thereafter the outer end of the valve sleeve will engage the shoulder 139 and additional movement of the body members begins to open the ports 98 and the abutment of the valve seat head 100 with the poppet valve 132 opens the same. Immediately after the ball members 142 clear the annular rib 111 of the valve sleeve the balls will engage the conical surface 114 and engage the backing surface 116 which positions the balls as shown in FIG. 7. In this position it will be appreciated that the minimum radial dimension of the balls from the coupling axis is less than the maximum radial dimension of the annular rib and it will be also appreciated that the maximum radial dimension of the ball retaining ring 122 is greater than the minimum axial radial dimension of the balls whereby the balls will engage the rightmost end of the retaining ring 122 as the body members are coupled.

Further movement of the body members toward each other engages the balls with the right edge of the ball retainer ring 122 and causes the ring to shift to the left compressing the spring 126. This movement of the ball retainer continues until the balls are axially aligned with the recess 118 at which time the radial force vectors being imposed upon the ball by the retainer ring will cause the balls to move radially outward into the recess as shown in FIG. 8. Upon movement of the balls into the recess 118 the ball retainer is able to move to its rightmost position and thus maintain the balls within the recess as shown in FIG. 8.

Th body members are illustrated in their fully coupled position in FIG. 8 and it will be appreciated that due to the opening of the valve sleeve 110 and the poppet valve 132 fluid communication between the bores of the body members has been fully established. Also, as the ball retaining ring 122 is now in a direct opposed relation to the recess 118 the balls are being positively retained within the recess and the body members are now locked together in a positive manner. It will be thus appreciated that the coupling of the body members is automatically facilitated by merely moving the body members toward each other until the ball retainer ring snaps into the position of FIG. 8 and upon such time the operator may release the body members.

Disconnection of the coupling is easily accomplished by merely shifting the ball retainer ring 122 to the left by means of the outer ring 120, as shown in FIG. 9. This action will move the ball retainer from its opposed relation to the recess 118 and allow the balls to move radially inwardly out of the recess. As the shoulder 119 is tapered, FIG. 5, the forces exerted by the springs 112 and 133 tending to separate the body members will cause the balls to ride out of the recess and over shoulder 119 as the body members separate and upon leaving the recess the balls will engage the backing surface 116 in a relationship similar to that of FIG. 7. As the balls move to the right, in respect to the body member 92, they will engage the inner surface of the annular rib 111 and, thus, move the valve sleeve 110 to the right if the spring 112 is inadequate for this purpose. Thus, a positive connection between the balls and valve sleeve will be maintained as long as the balls engage the backing surface. Upon the valve sleeve reaching the fully closed position the balls will leave the backing surface 116 and, hence, may be radially moved outwardly by the annular rib 111 to permit the balls to clear the rib and the body members to completely separate. Upon complete separation the valve components of both body members will be as shown in FIGS. 5 and 6 and fluid will not flow from either member due to the closing of the valves.

It will be thus appreciated that the embodiment of FIGS. 5 through 9 utilizes radially movable ball elements to both facilitate the connection between the body members and insure the positive closing of the valve sleeve. The locking connection produced by the balls and ball retainer is not likely to fail due to vibration and it is easily operable, the connection of the body members being accomplished merely by moving the body members toward each other and disconnection requiring only the axial movement of the ball retainer to the left.

While only one embodiment of means for actuating the valve sleeve is illustrated it will be appreciated that a variety of actuating means may be employed, other than radially movable ball elements, to connect the valve component of one body member with the other body member during separation of the members and it is intended that the invention include such modifications as are within the skill of one versed in the art and that the invention be defined only by the scope of the following claims.

We claim:

1. In a fluid coupling having first and second bored interconnectable body members, a valve movably mounted concentrically within said first body member cooperable with a valve seat controlling the flow of fluid therethrough, a radially extending shoulder defined on said valve, first means formed on said second body member engaging said valve during movement of said body members in a coupling direction toward each other opening said valve and second means carried by said second body member engaging said valve during movement of said body members in the uncoupling direction away from each other, closing said valve, said second means comprising elements radially movable with respect to said valve operably engaging said shoulder during uncoupling of said body members.

2. In a fluid coupling as in claim 1 wherein said elements are mounted in an annular portion of said second body member which circumscribes said valve during engagement of said body members.

3. In a fluid coupling having first and second bored interconnectable body members, a bore within said first body member, a movable valve and a valve seat within said first body regulating the flow of fluid through said bore, said valve comprising a tubular sleeve having a radially extending shoulder defined on the exterior surface thereof, an annular ring portion defined on said second body member axially receiving said valve during connection of said body members, means on said second body member opening said valve during coupling of said body members, a plurality of radially movable elements carried by said ring portion, and means formed on said first body member causing radial movement of said elements upon insertion of said ring portion into said first body member whereby said elements engage said shoulder during uncoupling of said body members to close said valve.

4. In a fluid coupling as in claim 3 wherein said means formed on said first body actuating radial movement of said elements comprises an annular cylindrical backing surface defined in said first body member circumscribing said valve in spaced relation thereto.

5. In a fluid coupling as in claim 4 wherein said elements comprise spherical balls engaging said backing surface upon connection of said body members.

6. In a fluid coupling having first and second bored interconnectable body members, valve components within said first body member controlling the flow of fluid therethrough comprising a movable valve engageable with a valve seat, first means formed on said second body member engaging with and shifting said valve to the open position during coupling of said body members, second means carried by said second body member engaging said valve during uncoupling of said body members shifting said valve to the closed position and means defined on said first body member lockingly cooperating with said second means upon complete connection of said body members locking said body members together, said means defined on said first body member lockingly cooperating with said second means comprising a shoulder and means mounted on said first body member maintaining said second means in engagement with said shoulder upon complete connection of said body members.

7. In a fluid coupling having first and second bored body members, a movable valve and a valve seat within said first body member controlling the flow of fluid therethrough, first means formed on said second body member engaging with and shifting said valve to the open position during the coupling of said body members, locking means carried by said second body member operably cooperating with locking means defined on said first member upon complete connection of said body members, said locking means carried by said second body member operably engaging said valve during uncoupling of said body members to shift said valve to the closed position and comprising a plurality of elements radially movable with respect to the axis of the bores of said body members, and said locking means defined on said first body member comprising a radially disposed shoulder.

8. In a fluid coupling as in claim 7 wherein selectively positionable means are mounted on said first body member and maintain said elements in engagement with said shoulder upon complete connection of said body members and means defined on said first body member maintain said elements in operable association with said valve during uncoupling of said body members.

9. In a fluid coupling having first and second bored body members, the bores of said body members being coincident with the axes of the body members, said body members being axially translated during the coupling and uncoupling thereof, an axially movable valve and a valve seat within the said first body member regulating the fluid flow therethrough, means carried by said second body member engaging with and shifting said valve to the open position during relative axial movement of said body members toward each other during the coupling thereof, radially movable locking means carried by said second body member, a radially extending shoulder defined on said first body member, an axially positionable locking means actuator mounted on said first body member radially displacing and maintaining said locking means in locking engagement with said shoulder upon complete connection of said body members locking said body members together, said locking means operably engaging said valve during uncoupling of said body members to shift said valve to the closed position.

10. In a fluid coupling as in claim 9 wherein said locking means comprises a plurality of spherical ball elements supported for radial movement within an annular sleeve portion defined on said second body member, said sleeve portion circumscribing said valve upon engagement of said body members.

11. In a fluid coupling having first and second bored body members, the bores of said body members being coincident with the axes of said body members, said body members being axially translated during the coupling and uncoupling thereof, an axially movable valve and a valve seat within the said first body member regulating the flow of fluid therethrough, a radially extending shoulder defined on said first body member, a radially extending shoulder defined on said valve, means carried by said second body member engaging with and shifting said valve to the open position during relative axial movement of said body members toward each other during the coupling thereof, radially movable locking means carried by said second body member, an axially positionable locking means actuator mounted on said first body member radially displacing and maintaining said locking means in locking engagement with said shoulder on said first body member upon complete connection of said body members locking said body members together, and a backing surface defined on said first body member maintaining said locking means in engagement with said valve shoulder during uncoupling of said body members.

12. In a fluid coupling having first and second body members, axial bores in said body members, valve components within said first body member controlling the flow of fluid therethrough comprising a shiftable concentrically disposed sleeve valve member engageable with a valve seat, a generally concentrically disposed longitudinally open fixed valve member carried by said second body member engaging with and shifting said sleeve valve member to its open position during the coupling of said body members, said valve members themselves forming in the fluid coupling a passage intermediate the bores of said body members, said passage directly connecting the bores of said body members in the coupled condition of said body members for said passage directly to conduct fluid from one of said bores to the other of said bores, and means interconnecting said valve members externally of said passage to thereby shift said sleeve valve member to its closed position during uncoupling of said body members, said means comprising a radially extending shoulder defined on one of said valve members engageable with radially movable elements carried by the other valve member.

13. In a fluid coupling having first and second body members, axial bores in said body members, a backing sleeve defined on said first body member and said sleeve having a backing surface, valve components carried by said body members for controlling the flow of fluid through said coupling, said valve components including first and second valve members having telescoping portions and engaging portions, said engaging portions accommodating movement of said valve members during coupling of said body members, said valve members being longitudinally open and themselves forming in the fluid coupling a passage intermediate the bores of said body members, said passage connecting the bores of said body members in the coupled condition of said body members for said passage directly to conduct fluid from one of said bores to the other of said bores, the valve member having the radially outwardly disposed telescoping portion being provided with a plurality of radially movable elements and said portion being radially inwardly of said backing surface and radially outside the radially inwardly disposed telescoping portion during uncoupling of said body members, said valve member having the radially inwardly disposed telescoping portion being provided with an outwardly extending shoulder, and said radially movable elements contacting said backing surface and engaging said shoulder in coupling relation during uncoupling of said body members.

References Cited by the Examiner

UNITED STATES PATENTS

| | | | |
|---|---|---|---|
| 2,255,593 | 9/1941 | Burger et al. | 137—614.04 |
| 2,511,765 | 6/1950 | Bradbury | 285—1 |
| 2,637,572 | 5/1953 | Bruce | 137—614.02 |
| 2,714,518 | 8/1955 | Balass | 137—614.03 |
| 2,765,181 | 10/1956 | Butterfield | 137—614.03 |
| 2,854,259 | 9/1958 | Clark | 137—614.03 |

FOREIGN PATENTS 337,373   5/1959   Switzerland.

M. CARY NELSON, *Primary Examiner.*

MORRIS M. FRITZ, WALTER A. SCHEEL, ISADOR WEIL, *Examiners.*